United States Patent [19]

Welch

[11] Patent Number: 5,534,280

[45] Date of Patent: Jul. 9, 1996

[54] METHOD FOR DEHYDRATION OF SOLID FOODS

[76] Inventor: George Welch, P.O. Box 2539, Santa Clara, Calif. 95055

[21] Appl. No.: 487,924

[22] Filed: Jun. 7, 1995

Related U.S. Application Data

[63] Continuation of Ser. No. 116,923, Sep. 7, 1993, abandoned, which is a continuation of Ser. No. 719,055, Jun. 21, 1991, abandoned, which is a continuation of Ser. No. 462,342, Jan. 2, 1990, abandoned, which is a continuation of Ser. No. 129,107, Dec. 4, 1987, abandoned.

[51] Int. Cl.$^6$ .............................. A23B 4/033; B01D 5/00
[52] U.S. Cl. ...................... 426/321; 426/402; 426/422; 426/442; 426/541; 426/639; 203/12; 203/41; 203/91
[58] Field of Search ........................ 426/442, 541, 426/281, 392, 348, 321, 540, 639, 397, 422, 402; 203/12, 14, 41; 204/1.11

[56] References Cited

U.S. PATENT DOCUMENTS

| | | | |
|---|---|---|---|
| 1,877,587 | 9/1931 | Rasche . | |
| 2,541,859 | 2/1951 | Callaghan | 99/204 |
| 2,641,550 | 6/1951 | Dykstra | 99/205 |
| 2,773,774 | 12/1956 | McCarthy et al. | 426/422 |
| 3,071,474 | 1/1963 | Gross | 426/384 |
| 3,169,564 | 2/1965 | Harrington | 146/235 |
| 3,174,869 | 3/1965 | Roberts | 426/465 |
| 3,365,309 | 1/1968 | Pader | 99/204 |
| 3,418,134 | 12/1968 | Rooker | 426/386 |
| 3,754,938 | 8/1973 | Ponting | 426/654 |
| 3,867,262 | 2/1975 | Rockland et al. | 203/91 |
| 3,894,157 | 7/1975 | Gottlieb et al. | 426/268 |
| 3,950,266 | 4/1976 | Chang et al. | 426/429 |
| 4,251,923 | 2/1981 | Kuri | 34/15 |
| 4,335,149 | 6/1982 | Stipp | 426/594 |

(List continued on next page.)

FOREIGN PATENT DOCUMENTS 60-09377  3/1976  Japan .................................. 426/639

OTHER PUBLICATIONS

Robinson, C. Recovery of Vapors, 1942. Reinhold Publishing Co., New York, New York.
Tressler, D. and Joslyn M., The Chemistry and Technology of Fruit and Vegetable Juice Production, 1954. The AVi Publishing Co., Inc. New York, New York.
Cruess, W., Commercial Fruit and Vegetable Products, 1938. McGraw–Hill Book Co., New York, New York.
Smock, R. and Neubert, A., Apples and Apple Products, 1950. Interscience Publishers, Inc., New York, New York.
Richardson, L. and Scarlett, A., Brief College Chemistry, 1942. Henry Holt and Company, New York, New York.

(List continued on next page.)

Primary Examiner—Virginia Manoharan
Attorney, Agent, or Firm—Townsend and Townsend and Crew

[57] ABSTRACT

A process for treating a solid food product having water soluble and water insoluble volatiles soluble in alcohol and ether. The process includes cutting the product into pieces, placing the product pieces in a volume of water containing an anti-oxidant, and drawing a vacuum on the product pieces in the water to pull air out of the cells of the product pieces. The vacuum is released to cause water, and the anti-oxidant to enter the cells of the product pieces. The product pieces are then heated to dry the pieces and to drive off a mixture of water vapor or steam and the water soluble and water insoluble volatiles. The mixture is directed through an adsorbent to remove the water soluble and water insoluble volatiles from the mixture by an adsorption. Steam is passed through the adsorbent to remove the water soluble volatiles from the adsorbent. Ethyl alcohol is passed through the adsorbent to remove the alcohol soluble, water insoluble volatiles from the adsorbent. Ether is directed through the adsorbent to remove the water insoluble, ether soluble volatiles from the adsorbent. The steam is condensed and stripped of its volatiles to form purified water and purified water is added to the water insoluble volatile mixture to the dried product pieces to correct for overdryness.

24 Claims, 1 Drawing Sheet

U.S. PATENT DOCUMENTS

| | | | |
|---|---|---|---|
| 4,380,506 | 4/1983 | Kimura et al. | 426/429 |
| 4,406,760 | 9/1983 | Knudson et al. | 204/78 |
| 4,514,428 | 4/1985 | Glass et al. | 426/639 |
| 4,544,459 | 10/1985 | Struck et al. | 204/103 |
| 4,551,348 | 11/1985 | O'Mahony et al. | 426/639 |
| 4,561,941 | 12/1985 | Dinnage | 203/24 |
| 4,634,549 | 1/1987 | Case | 252/522 |
| 4,647,469 | 3/1987 | Jakobsson | 426/524 |
| 4,654,222 | 3/1987 | Fuller | 426/640 |
| 4,680,142 | 7/1987 | Pittet et al. | 426/538 |
| 4,754,090 | 6/1988 | Vila Peris et al. | 585/240 |
| 4,970,085 | 11/1990 | Persson et al. | 426/330.5 |
| 4,996,070 | 2/1991 | Nafise-Mouaghar | 426/655 |
| 5,055,313 | 10/1991 | Warren . | |
| 5,256,438 | 10/1993 | Lewis et al. . | |
| 5,260,088 | 11/1993 | Bernard . | |
| 5,330,654 | 7/1994 | Humphrey et al. . | |

OTHER PUBLICATIONS

Federal Food and Drug Administration, 1983. Talk paper: Sulfiting Agents. T83–9.

The Re-examination of the Gras Status of Sulfiting Agents. Jan., 1985. Prepared for: Center for Food Safety and Applied Nutrition, Food and Drug Administration, Washington, D.C. 20240.

Sulfite Research Statement Hit for Generating Doubt on Labeling. Food Chemical News: Jun. 23, 1986.

Correspondence: (1) Custer Sep. 24, 1985; (2) Maryanski Oct. 31, 1985; (3) Custer May 15, 1986; (4) Wills Jul. 26, 1986; (5) Custer Oct. 17, 1986.

Milleville, H. and Eskew, R. 1946. Recovery of Volatile Apple Flavors in Essence Form. Western Canner and Packer Magazine, Oct. 1946.

Newsfront Section, 1987. Hydrogen Research: Back in the Spotlight. Chemical Engineering, Oct. 26, 1987.

Lazar, M. and Hudson, J. 1974. Flexible–Pouch Packed Two–Fold Concentrated Apples Slices. A paper given at the National Institute of Food Technologists Annual Meeting in Jun., 1974.

METHOD FOR DEHYDRATION OF SOLID FOODS

This application is a continuation of Ser. No. 08/116,923, filed, Sep. 7, 1993, abandoned, which is a continuation of Ser. No. 07/719,055, filed Jun. 21, 1991, abandoned, which is a continuation of Ser. No. 07/462,342, filed Jan. 2, 1990, abandoned which is a continuation of Ser. No. 07/129,107, filed Dec. 4, 1987, abandoned.

This invention relates to improvements in the retrieval of valuable usable constituents from food products, and more particularly, to apparatus and method for dehydration of solid and liquid foods to recover volatiles, distilled water and other products.

Many solid foods (apples, tomatoes, potatoes, carrots, peppers, plums, peaches, etc.) are peeled prior to processing. The surface of the peel contains volatiles in the oil-fat-wax coating of the fresh food materials. By washing the product prior to processing with a solvent, the volatile fraction of the solid food is removed. The solvent is removed from the solvent-volatile mixture by distillation, and the pure volatiles fraction remains for combination with the to-be-derived volatiles produced from the dehydration process. The complete process provides volatiles from both the surface of the product and dehydration.

Another use of the adsorbent volatile trap is to obtain pure volatiles and distilled water from industrial evaporated water and volatile mixtures. In liquid (juice) concentration, the first portion of the steam evaporated contains 90–95% of the total volatiles. This portion is held separate from the subsequently evaporated portions that contain no volatiles. The portion with volatiles is fractionated to obtain a more concentrated flavor which at maximum strength is about 99.9% water and about 0.1% volatiles. In terms of fold, it is about 150 times the strength of the original juice flavor. By passing the water volatiles (150 fold) through an adsorbent, the volatiles (0.1%) are removed and the natural organic adsorbent-filtered water is collected. The volatiles and the distilled water are derived from natural organic sources and are accordingly considered as natural organic products. In brief, the industrial liquid (juice) concentration process is (1) concentrate the juice, (2) collect the first portion of the steam which contains the volatiles and (3) discard the other portions of the steam. The present invention introduces a new step after step 2 by placing an adsorbent as step 3 to separate the approximate 99.9% water-0.1% volatiles by trapping the volatiles in the adsorbent and collecting the steam as natural organic adsorbent-filtered distilled water. The volatiles and distilled water will then be used as described in the first section. The steam after the first portion with volatiles, is condensed and returned to a holding vessel to be used as natural distilled water containing no volatiles; however, there can be an introduction of some volatiles or a return of all of the volatiles to the water, if desired.

BACKGROUND OF THE INVENTION

Volatiles (essences) are lost in the processing of agricultural products and particularly in the processing and drying of products, such as fruits and vegetables.

The present invention has as a first aspect the recovery of the volatiles from the surface of agricultural products. The smell of a fresh apple, for instance, is a small part of the total apple aroma. The surface aroma is a specific part of the total aroma and occurs no place else in the apple. When solid food products, such as peeled, cored, sliced apples are dried, the sliced apples oxidize and become brown. While the apple slices are drying, the slices give off steam or water vapor that contains water and volatiles. A process of the present invention separates the steam into volatiles and distilled water. The volatiles from dehydration are combined with the volatiles recovered from the surface of the apple to give complete apple essence (total volatiles). The volatiles may also be blended with the distilled water to yield different levels of essence-flavored distilled water. The volatiles may be sold separately as a commercial product.

The conventional dehydration process changes the composition of foods, usually to the detriment of the food quality. Dried fruits and vegetables become brown, flavorless and unappetizing. To avoid the oxidized, flavorless characteristics caused by the drying process, a pretreatment blanching (hot water or steam) or a gaseous (sulfur dioxide) or sulfite solution or anti-oxidant dip and/or soak (ascorbic acid) is used singularly or in combination. The best of these alternatives is unsatisfactory. Blanching whitens and softens the texture of fruits and vegetables. Sulfur dioxide and sulfites cause a product to bleach, and give an unnatural color, giving a sulfite taste, not a natural taste, and change the nutritional value of the product as well as introducing a potentially dangerous allergic presence in terms of the sulfite.

Anti-oxidants, such as ascorbic acid, provide fruits and vegetables with short-term effectiveness and resistance to browning and product degradation. The anti-oxidants are expensive in relation to the other processes. A product such as apple slices with these pretreatments will produce natural volatiles except when the apples are treated with sulfur dioxide or sulfites. Apples so treated tend to have sulfite-contaminated essence and cannot be used directly in food products.

The present invention includes a vacuum process which is an improvement over the above-mentioned pretreatment options (blanching, sulfur dioxide, sulfite, anti-oxidant dips and/or soaks). When water solutions of anti-oxidants and/or sulfites are used to submerge and subject the food product to vacuum, air is removed from the food product cells and replaced with a water solution and its ingredients. Ingredients placed in the cells are more effective than ingredients on the outside of the cells. With the vacuum process, the blanching, sulfur dioxide, sulfites and anti-oxidants may be modified and used in more effective combinations.

By use of the vacuum solution of the present invention containing selective ingredients, improved and new products become possible. A product termed dehydro-canned is dehydrated to one-half its fresh weight and canned (pasteurized). With apple slices, the only previous way to dry to one-half dryness was to pretreat with sulfur dioxide or sulfite solution. The problem was that the sulfite remaining in the apple attacked the inside of the can and blackened the apple.

The process of this invention uses anti-oxidants and selected ingredients in place of sulfites. The dehydrated apple slices are natural in color, flavor and texture and have no sulfite to attack the can. The dehydro-canned apple slices enable the equivalent of two cans of fresh apple slices to be canned as one can.

Agricultural products vary in quality. Some products such as apples and carrots lack sweetness, flavor, color, texture and general quality. By placing sugar or an artificial sweetening agent in the vacuum solution, the sweetening agent is placed inside the cell and sweetens the product. Natural or artificial flavors and/or colors can be added to the solution. A texture firming agent, such as calcium chloride, and a chelating agent such as EDTA, is used to protect, promote and preserve color. Previously fruits and vegetables were dehydrated without enhancement. Unsweet, fresh apples become unsweet, dehydrated apples. The present invention improves the quality of the fresh agricultural products.

The essence recovery, distilled water recovery systems of the present invention also apply to commercial evaporators and juice concentration equipment. The present procedure used in these processes is (1) to bring the liquid juice to a boil, (2) to collect the first portion of the boiled steam which contains the volatiles in a highly water diluted form and to fractionate the diluted volatiles to a less water-diluted form (about 99.9% water-0.1% volatiles) for commercial use, and (3) to discard the steam generated after the portion with the volatiles is removed.

The present invention extends step 2 of the prior art process mentioned above. After the completion of fractionation to approximately 99.9% water and 0.1% volatiles, the mixture is brought to a boil and the water-volatiles vapor passed through an adsorbent, such as charcoal, where the volatiles are removed and the steam cooled to become natural organic derived charcoal-filtered distilled water. The charcoal-filtered distilled water and/or the portion of the steam that does not contain volatiles may be used as a natural drink or manufacturing base for beverages, water packed foods and substitution for non-organic natural water in the food and cosmetic manufacturing process. The manufactured distilled water may also be treated with acid, such as sulfuric and separated into hydrogen and oxygen gases by electrolysis. Hydrogen is used for ion exchange regeneration. Oxygen is used for treatment of organic biodegradable foods. The gases have established commercial markets.

Frozen fruits and vegetables that have been subjected to pretreatment for subsequent dehydration with essence and distilled water recovery may be processed. Irradiated agricultural products may be pretreated for dehydration with essence and distilled water recovery. Peeled, cored, pitted fruits and vegetables may be pretreated, pureed and dried with essence and distilled water recovery.

Present and historical practice for drying agricultural products has been to use the minimum amount of water since any added water must be evaporated from the product during the drying process. Drying costs are frequently more than half the cost of processing. The addition of water even by vacuum would seem to defy the established logic except that my invention increases the profitability of the operation by reclaiming the previously lost valuable volatiles and distilled water, eliminates problems caused by sulfites, and makes possible new and improved products.

SUMMARY OF THE INVENTION

The present invention includes apparatus and method which provides for the recovery of volatiles from the surface of agricultural products. The agricultural products (solid foods) are then dehydrated to various degrees of dryness and the volatiles and steam therefrom recovered separately. Both the surface volatiles and dehydration volatiles may be combined to give a total essence. The recovered distilled water may be mixed with volatiles. The distilled water and/or volatiles may be used as a beverage base or for manufacturing purposes. The distilled water may be converted to hydrogen and oxygen gases by electrolysis. A pretreatment may be needed prior to dehydration to improve or preserve the quality of the solid food product. This may be to sweeten the product or prevent color, flavor or texture degradation. The degree of dryness and unit size reduction will determine the final product and use.

Industrial evaporators used to concentrate such products as fruit juices, recover volatiles in a highly diluted solution. The charcoal unit of the present invention placed after the initial collection separates the water and volatiles. The system of the present invention can be used on dryers, grinders, and equipment where volatiles are present.

The dried fruit industry is considered to be divided into three different groups, namely whole fruits (prunes, figs, raisins, etc.), cut-fruit (apricots, pears, peaches, etc.) and apples. The following discussion will relate to apples although the discussion can apply to whole and cut-fruit products as well as vegetables, such as potatoes, peppers, carrots, tomatoes, etc.

Dried apples are processed chiefly on the West Coast in California and Washington. Dried apples are mostly sold as 24% moisture or low moisture below 5%. The apples are processed as follows: Fresh apples are washed, peeled, cored, and sliced. The sliced fresh apples are dropped into a water solution containing sulfite. The apples remain in the solution for about 10–20 seconds. The sulfite, usually sodium metabisulfite, provides a solution of about 10,000–20,000 ppm. The apples treated with the sulfite pass to a moving heated conveyor and are dried at a temperature of roughly 130° to 165° Fahrenheit for about 5–8 hours. The sulfite releases sulfur dioxide which is a gas, during the drying to keep the apple slices from turning brown or from oxidizing. The sulfite is used up during the drying. After being dried, the apples again must be sulfited so that the color and flavor of the apples will be preserved. (See Appendix A).

Sulfur dioxide is a bleach. It gives the dried apple an unnatural white color. Sulfur dioxide also gives a sulfur taste to the dried apples. Sulfur dioxide (sulfites) have been found life-threatening to asthmatics. The Federal Food and Drug Administration has issued new limits and labeling rules. The Environmental Protection Agency has issued new rules and permits many companies in the dried fruit and vegetable industry to operate with a temporary variance.

Because of the foregoing drawbacks with the use of sulfites in the drying of apples, fruits and vegetables a great need has existed for an improvement in the way in which the fruits and vegetables are processed so as to avoid the above-mentioned problems as well as to retrieve the essences which leave the fruit and vegetables during the processing thereof. The present invention provides such improvements.

DESCRIPTION OF THE PREFERRED EMBODIMENTS

Figure 1:
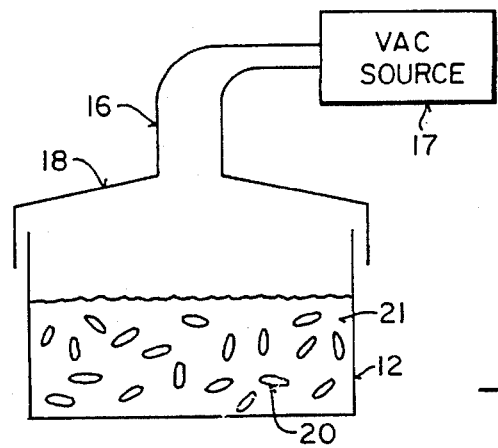
FIG. 1 is a schematic view of a vacuum system for pretreatment of food products in a selective solution under vacuum.

An apparatus of the present invention for processing of a food product is shown in FIG. 1 and is used in a manner to replace the use of sulfite in water as in the prior art mentioned above. In the present invention, anti-oxidants, such as ascorbic acid and citric acid, can be used. To make the anti-oxidants more effective, a vacuum is pulled through a tube 16 on a top 18 covering the tank 12. The tube 16 is coupled with any suitable vacuum source 17, and the vacuum is pulled on the food products, such as apple pieces or slices 20, while the apples slices are in a solution 21.

The vacuum pulls the air out of the apple flesh, cells and pores. When the vacuum is released, the water with the anti-oxidants, fills the apple cells. The air, which is a factor in oxidation is not present. The anti-oxidants are, therefore, inside the apple cells where they can be most effective. This technique of using a vacuum results in greater cost than merely putting sulfite in water. Sulfites are cheap. Sulfites, however, result in limited dried fruit and vegetable consumer uses because of the bleached white color, spongy texture, chemical sulfite taste, and potential danger to asthmatics and hypersensitive individuals. Sulfites also contaminate the volatiles giving them a pungent unnatural irritating smell that renders the volatiles unsuitable for food use and represents a commercial loss to the dried food processor. This has not been obvious to the processors heretofore since the processor focused on only one part of the process rather than the total process and lacked awareness of new technologies. My invention corrects this oversight by providing a total process perspective with modern technology.

Figure 1A:
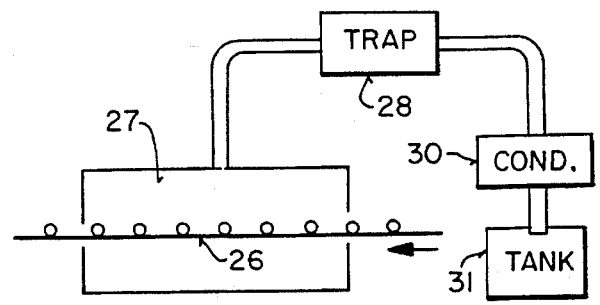
FIG. 1A is a schematic view of a dehydration means forming part of the present invention.

With the anti-oxidant, vacuum-treated apple slices, it is possible to dry the slices and collect the essence with a charcoal trap, such as in the apparatus of FIG. 1A, wherein apple slices 20 on a conveyor 26 pass through a heating region 27, and the volatiles are collected by a trap 28 of charcoal or other adsorbent. Sulfur contaminates the essences and since the method of the present invention has no sulfite, the essence trapped by trap 28 is pure and is better than commercial apple essences. Apple essences at this time sell at about $10 per gallon (150 fold) which pays for the vacuum process and provides a substantial profit. It also eliminates the constraints of the Federal Food and Drug Administration and the Environmental Protection Agency. Moreover, dried apple slices have a natural apple color, a natural (not sulfur) taste, a natural texture (no sulfite spongy texture) and rehydrate more quickly than commercial sulfite prepared dried apples.

The result of carrying out the technique of the present invention with the apparatus of FIGS. 1 and 1A is a sulfite-free, natural, dried apple. The essence trapped by trap 28 is 100% pure apple essence. The only part missing is the water. When the steam (water vapor) leaves the apple slices as they dry, the essence is removed by charcoal from the essence-water and heat mixture. The steam passes through the charcoal trap, condenses by a condenser 30, and is collected in container 31. The condensate is termed natural organic charcoal-filtered distilled water. The charcoal-filtered water is from an organic apple. The water has been filtered through the apple tree and the system is so claimed as natural and organic.

Figure 2:
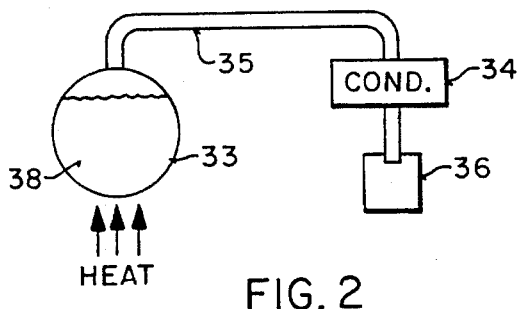
FIGS. 2, 3 and 4 are schematic views of apparatus for separating volatiles from steam after boiling a juice.
Figure 3:
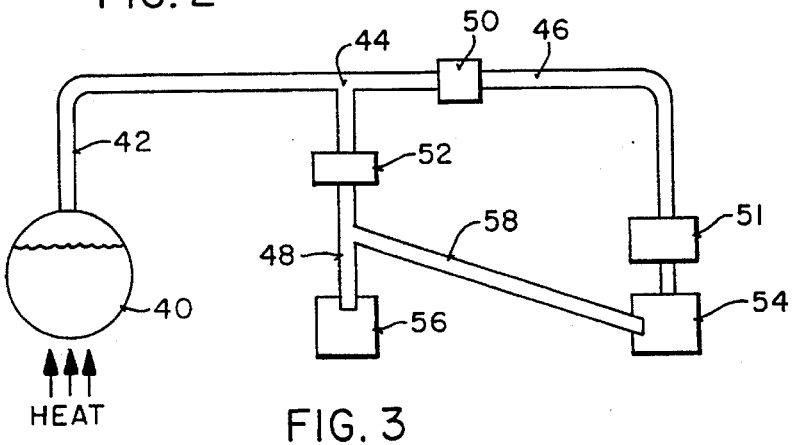
Figure 4:
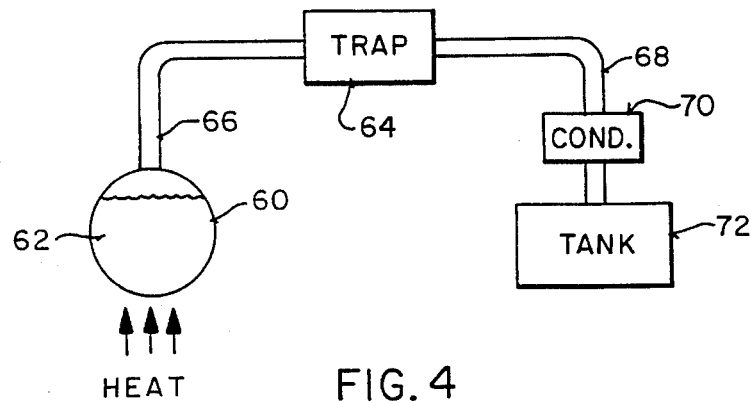

FIGS. 2–4 disclose schematically the apparatus for recovering distilled water with and without volatiles therein.

The process of water distillation is well-known. Water is brought to a boil and the generated steam is cooled, resulting in distilled water. Presently, evaporators are used to remove water from fruit and vegetable juices to reduce the water content of these juices. One result is water-reduced juices which are commercially sold as concentrated juices. The other result is water discharge. The water is discharged to the environment and an aspect of the present invention is to retrieve the water distilled from the juices. The water may contain volatiles from the juices or the volatiles may be completely or partially removed by volatile recovery units, frequently termed essence recovery systems.

FIG. 2 shows a tank 33 coupled by a tube 35 to a condenser 34 above a second tank 36. Four gallons of fruit juice, such as fresh-pressed apple juice 38, is placed in tank 33 and evaporated by the application of heat to the underside of the tank as shown in FIG. 2. In a particular example, four gallons of fresh-pressed apple juice was evaporated from its original 14.1% sugar content to about 45.0% sugar content in a commercial evaporator defined by tank 33 and the heat source therebeneath. The water vapor from the evaporation traveled through tube 35, through cooler 34 and was condensed and allowed to fall into tank 36. The water vapor in the tube 35 contains the volatiles so that volatiles will be in the distilled water in the tank 36. The resulting water condensate comprises 3 gallons and was tested for purity, taste-tested, and proven to be a pleasing distilled water drink.

Other apparatus for recovering distilled water from the evaporation of fruit and vegetable juices is shown in FIG. 3 in which a tank 40 is coupled by a tube 42 to a tee 44 which directs water vapor containing volatiles into tube 46 or into tube 48. Tube 46 has a valve 50 in it and it directs water vapor to a condenser 51 where the water vapor condenses and falls as condensate into a tank 54.

Tube 48 has a valve 52 and enters into a first lower tank 56. It also has a side tube 58 for directing distilled water entering tube 48 from tee 44 into tank 54.

In a specific example of the use of apparatus of FIG. 3, four gallons of boysenberry juice was heated to boiling in tank 40 and steam and volatiles traveled through tube 42 to tee 44. With valve 50 closed and valve 52 open, 0.3 gallons of the juice's water-essence from tank 40 was boiled and collected as water-essence in tank 56. The essences in tube 48 were contained in 0.3 gallon of the evaporated juice, 0.2 gallon flowing through side tube 58 to tank 54 after reboiling and leaving about 0.1 gallon flowing into tank 56. This 0.1 gallon in tank 56 contains the volatiles. The heat supplied to tank 40 evaporate 3 gallons of the 4 gallons in the tank 40. A volume of 2.7 gallons pass through tube 46 to condenser 51 where it is condensed and deposited as a condensate in tank 54. A volume of 0.2 gallons is directed through tube 58 into tank 54 so that tank 54 contains 2.9 gallons of distilled water without the volatiles, and tank 56 contains 0.1 gallon of water with volatiles. The resulting distilled water in tank 54 was tested for purity, taste tested and proven to be a pleasing distilled water drink. The process varies as to yield and the figures given are intended to be general and not specific.

In a third example as shown in FIG. 4, a tank 60 containing 4 gallons of tomato juice 62 was heated by a heat source below the tank so that the tomato juice was evaporated from 6.0% original sugar content to about 24.0% sugar content. The steam-volatiles were passed through granular charcoal in a trap 64 in a line 66 having an outer end segment 68 coupled to a condenser 70 for directing condensate to a tank 72. The volatiles were removed by the charcoal, the steam cooled to water. This water is charcoal-filtered and natural organic distilled water. The water was tested for purity, taste tested and proven to be a pleasing distilled water drink. When 4 gallons beginning volume of tomato juice was in tank 60, the tomato juice was evaporated to 1 gallon and left in the tank 60 and 3 gallons of distilled water was collected in tank 72. No volatiles were in the water in tank 72. These figures are general. The relationship is valid for both small and industrial evaporators.

It is to be understood that the volatiles in the examples set forth in the use of the structures of FIGS. 2–4 can be regulated as to the amount permitted to pass through to the distilled water. For instance the first 1% or 2% of the generated steam-volatile mixture can be drawn off as separate volatiles. This lets various percentages of the volatiles into the distilled water. Charcoal traps, by the use of multiple trays, work in similar fashion.

To extract the essence from the charcoal trap 64, ether can be used. The ether is distilled from the essence, and the essence is cleaned with nitrogen gas and stored or preferably refrigerated as 100% pure volatiles.

The naturally derived organic distilled water as generated by the operation of the apparatus of each of FIGS. 2–4, can be used as a base for water-canned fruits (apricots, peaches, fruit cocktail, grapes and the like) with all, few and no volatile variations. The volatiles contained in the naturally distilled water contribute flavor and enhance the product flavor.

Water treatment plants frequently use chlorine, fluoride and other treatment chemicals. This water may actually have a taste not typical of untreated drinking water. Water so treated can be eliminated in favor of natural distilled water which can be used as a base to be sweetened and the sweetened water used as a syrup for canned fruits (apricots, peaches, pears, etc.) and vegetables (dried, canned kidney beans, etc.). Natural organic distilled water can also be used with and without returned volatiles and mixed with fruit juices and natural flavors, carbonated and bottled. Apple, grape, strawberry, orange, lime and lemon-lime have been prepared using the distilled water of the present invention.

Fresh apples have an oil-essence-fat-wax coating on the outside of the peel. This coating is removed with an ether wash. The ether is distilled off, leaving a pure, no water essence fraction.

The apple after peeling, coring may be processed as whole or sliced or diced, or cut into different styles. When the apple flesh is exposed to air or damaged, the apple turns brown and oxidizes. To keep the apple flesh from turning brown, the typical conventional way is as follows, first dip into hot water as a blanch or second, steam the apple as a blanch, or third use direct solution dips or sprays with anti-oxidants and chemicals such as ascorbic acid, citric acid, isoascorbic, EDTA, ascorbic acid-2-phosphates, ascorbic acid-6-fatty acid esters, sodium metabisulfite or erythorbic acid.

Since some 70 varieties of apples vary as to their resistance to browning, the procedure to prevent browning varies for each variety. As such, the following combinations occur: hot water blanch only, hot water blanch with chemical dip, chemical dip with hot water blanch, steam blanch only, steam blanch followed by chemical dip, chemical dip followed by steam blanch, blanch followed by chemical dip followed again by blanch.

Apples for drying are chiefly preserved by sulfites in a dip. Apples for canning or freezing are frequently supplemented with blanching. Sulfites change the color, flavor, texture, nutritional and toxic components of the apple. The use of the dip solution under vacuum will take air from inside the apple cells and place the anti-oxidants inside the apple where they are more effective. Some apples can, because of varietal and individual differences be preserved with no sulfite, others with small amounts (under 300 ppm) of sulfite, and other apples that require sulfite with less sulfite than a conventional dip procedure since the vacuum placed sulfite is more effective. After treatment of the apple pieces with a combination of blanch and/or vacuum and chemical solution, the apples may be blanched again. This again represents possible combinations as follows: hot water or steam blanch/vacuum solution/blanch, vacuum solution/blanch, vacuum solution, hot water or steam blanch/vacuum solution. After the peeling/coring/slice size reduction and anti-browning (blanch-vacuum chemical solution) preparation, apple pieces are ready for dehydration. The pieces enter a dehydrator (usually 130° to 165° Fahrenheit). The length of the drying period varies generally as to apple variety and size of the apple unit. While drying, the charcoal essence recovery system of the present invention removes the essence from the apple vapor and the remaining steam will pass through the charcoal and be recovered as natural organic charcoal-filtered distilled water. The essence is affected by sulfite. Thus, the reclaimed essences are as follows:

1. Essence from vacuum solution and/or blanched treated apples containing no sulfite is 100% pure and commercially complete essence.
2. Essence from vacuum solution treated apples containing less than 300 ppm sulfite will usually be pure and a commercially pure essence. Small amounts of sulfite react with apple tissue to form complex molecules (new compounds) and do not leave the apple during drying.
3. Essence from vacuum solution treated apples containing 1000 ppm or more of sulfite will be sulfite contaminated and will not be pure. This essence will be used for manufacturing purposes and will be further processed. The charcoal keeps the sulfite from escaping into the atmosphere. This ensures compliance with the Environmental Protection Agency clean air emission tolerances. Vacuum solution with sulfite permits less sulfite to be used which aids in compliance with Federal Food and Drug limits of 10 ppm or the requirement of a label declaration.
4. Only 10% of the weight of the fresh apple needs to be dried to steam off 90–95% of the essence. Once the essence has left the apple, the processing is reconsidered.

Since the vacuum solution placed anti-oxidants, chemicals, needed sugar or artificial sweeteners, flavor, color, and nutrients in the cell, the dried apple piece is more resistant to browning and abuse than a fresh apple. The dried apple piece can be rehydrated with a treated solution to add back the 10% of the fresh apple moisture lost in drying. The added-back rehydration solution may contain many ingredients and anti-oxidants or sulfite as needed. The apple pieces are restored to the original moisture content of fresh apples. It should be emphasized that the vacuum solution makes possible the upgrading and standardization of the apples in addition to anti-browning and preserving quality. Sugar added to the vacuum solution sweetens not-sweet apples. Fruit essence added to the vacuum solution adds natural flavor to bland apples. Calcium chloride adds firmness to texture. EDTA (Calcium Disodium Ethylenediaminetetraacetate, Disodium EDTA, etc.) promotes, protects and preserves color. Flavor increases flavor. The upgraded apples may be chilled and refrigerated, individually quick-frozen, frozen in mass without sugar and/or ingredients, or canned and pasteurized.

If the apple units are dried to less moisture than fresh apples, the apple unit is a dried apple product. For instance, if 10% of the fresh apple weight is evaporated in the form of steam, the 10% less-water apples can be processed and sold as 10% dried chilled, IQF, frozen, and canned apples. The apple units can be dried additionally to remove 20%, 30%, 40% and 50% of the weight of the apple in the form of moisture. At 50%, dried apples and other similarly dried fruits and vegetables are termed dehydro-canned and may be blanched and/or pasteurized. At the 50% level, one can of dehydro-canned product is equal to two cans of fresh fruits or vegetables. The 50% dried fruit can be frozen; it is then termed dehydro-frozen. The dehydro-canned product must be treated with a vacuum solution without sulfite since sulfite reacts with the cans used for the product. A reduction of 60%, 70%, 80% of weight gives a progressively drier product. Commercial dried apples are usually 24% moisture or below 5% moisture. Products dried to this degree may be sulfited for sulfite acceptance food markets or treated with anti-oxidants and/or chilled, frozen or canned.

While apple styles have been discussed in processing terms, only one type of natural apple is prepared for the organic food customer. These apples are peeled, cored, sliced and dried with no anti-oxidants or preservatives. The apples turn brown and oxidize. This brown color is accepted by the buyers of organic foods. While the apples are drying, essence is collected with the charcoal and the natural organic charcoal-filtered distilled water is collected as a drink. The distilled water is used as a natural drink with no essence, some essence or containing complete essence. The distilled water is also used as a base or component for canned fruits, vegetables or other products. The distilled water is also used as a source for the manufacture of hydrogen and oxygen gases which have a commercial market.

The present invention involves several process steps that may be used singularly or in combination to improve present products and develop new products with specific reference to dried fruits and vegetables.

Fresh fruits, vegetables and solid foods in general are washed with a solvent such as ether (also hexane, methylene chloride, etc.). The solvent extracts the essence-wax from the surface of the solid food. The solvent is then distilled from the essence-wax. The removal of the wax enables the solid product to be penetrated with soak and/or vacuum solution more easily and dehydrated more easily with energy and time savings as high as 20% and 30% in terms of blanching and pasteurization.

The solid food product next passes to a water and/or water/detergent wash. The recirculated waste water is passed through a carbon bed to remove any traces of solvent.

A product such as prunes enters the plant as a fresh prune plum. After washing, the fresh prunes are placed on trays and passed to drying tunnels. I have adapted my essence recovery process for the dehydrator. A meshed rib screened door filled with activated charcoal is placed at the steam-essence-heat exit of the dehydrator. An exhaust fan positioned to pull the steam-essence through the charcoal is an aid in faster drying and increases the efficiency of drying at the 3–5% level. Meanwhile, the essence from the prunes is trapped in the charcoal. The steam passes on through the charcoal. The charcoal will absorb up to 35% of its weight of essence. As such, the charcoal will handle a 24 hour industrial operation without the need to be changed though this is a minor task.

After collection, the charcoal is emptied from the charcoal door-trap into an enclosed stainless steel container and covered with a solvent to extract the essence from the charcoal. The preferred solvent is ether. Methylene chloride and hexane have been used. After the solvent removes the essence from the charcoal, the solvent is then distilled from the essence. The essence is cleaned with nitrogen gas.

Each fruit and vegetable essence has different characteristics and end uses. Solvents may be changed per essence. Each solvent and/or steam has its advantages and disadvantages. The fresh prune plum essence is of commercial quality with commercial value. The essence of dehydration may be added singularly or in combination with the essence recovered from the surface of the fresh prune plums to prune juice, prune juice concentrate, or prune products.

This is a new process. Essence has not been previously recovered from fresh prune plums. Essence has never been recovered from prunes drying in a dehydrator.

While the described prune process was discussed in terms of adapting essence recovery to the present process, the fresh prune plums may be subjected to vacuum in the discussed selective solution and dried in different style dehydrators and developed into new prune products or improved prune products such as dehydro-canned. Vacuum treated fruits and vegetables dry with more flexible cell walls and rehydrate more easily.

Apples are processed into many styles. My innovative processes may be adapted to fit the style. One style of dried apple is naturally dried. This style apple is cored, peeled, sliced and dried. Since no sulfite or anti-oxidants are used, the dried apple slices are an oxidized brown color. However, my essence adaptation enables the collection of good essence and good distilled water from this process.

Another apple style is fresh-chilled. Fresh apples are presently peeled-cored and as whole or sliced are dipped in sulfite or anti-oxidant and refrigerated. By treating the apples in a selective solution under vacuum, the apple cells and pores pick up the protective and enhancement ingredients internally. This results in a weight increase. By drying the apple slice or portion back to the original fresh weight (with essence recovery), the apple portion contains no added water and is better protected, preserved, and of better quality. The refrigerated shelf life is extended.

The apple portion (slice) can be dried to a level drier than the fresh apple moisture (water content). The apple portions may then be processed as: I.Q.F., Dehydro Improved or Frozen Dehydro (with or without sweetening agents).

The apple portions (slices) may be dehydrated to approximately 50% of the original fresh weight and canned as Improved Dehydro Canned.

An important characteristic of apples is that it requires only 10 or 15% of the apple moisture to be evaporated to obtain 90% or more of the available essence of commercial quality. This means that the apples being dried have given up their essence within one to two hours of drying time. Each fruit and vegetable varies as to the moisture it needs to release to yield a significant quantity and quality of essence. Apricots, pears, beets, tomatoes, and so forth, each has a required amount of evaporation for total volatile essence release. This means that short periods of dehydration are possible to recover essence before transfer to other processing points.

Dried apricots are prepared by cutting in half, removing the pit, placing on large 3×6 or 3×8 foot trays, treating with sulfur dioxide gas, or sulfite solution and drying in outside open areas termed dry yards for 3 to 5 days.

My method offers as one option the placement of the sulfur dioxide gas treated apricots into a selective solution with or without additional sulfites, subjecting to vacuum, and drying in drying tunnels within 18 hours. Dried apricots presently need to be dried under the sun to develop full color. However, using EDTA in a selective solution in which the sulfite-treated apricots are placed and subjecting the apricots to vacuum, enables the color to be developed without the need for sun-drying. This lessens the time for the drying process. It also eliminates the vast quantities of sulfur dioxide gas that are given off by the sulfur dioxide gas filled apricots into the environment during the 3 to 5 day drying period. The apricots after solution/vacuum treatment may be dried in the outside drying yard. The apricot processing can bypass the sulfur dioxide gas treatment and by increasing the sulfite content of the selective solution (a minimum of 2%), the dried apricots are equally preserved. EDTA provides color enhancement which is a new invention. Apricots can also be processed with no sulfite or low sulfite. There would be I.Q.F. Improved Apricots, I.Q.F. Dehydro Improved, Dehydro Canned and similar apricot styles.

Dried pears are presently halved, trayed, treated with sulfur dioxide gas for up to 48 hours and placed in an open air drying yard for 4 to 8 weeks to dry. Again, the highly sulfured pears release their sulfur dioxide into the atmosphere and the pungent sulfur dioxide frequently results in EPA regulatory action and complaints by neighbors. Pears, by reason of their texture, are difficult to treat with sulfite and to dry.

By placing the sulfur dioxide treated pear halves in a minimum 3% sulfite selective solution and subjecting to vacuum, the pear is more efficiently penetrated with the sulfite and may be dried in drying tunnels or drying units or returned to the drying yard for faster drying. When EDTA is added to the vacuum solution, the color is greatly improved and so claimed.

If the fresh pears are peeled, halved, cored, placed in a selective no sulfite solution, subjected to vacuum, blanched, and dehydrated with essence recovery, the pear halves may be further processed into dehydro-canned and other styles of processed pears. The process solution may be changed to low sulfite and high sulfite composition to fit the various dried pear styles.

Dried peaches are similar to apricots. The fresh peaches are halved, pits removed, placed on trays, treated with sulfur dioxide gas and/or sulfite solution, and placed in an outdoor drying yard where the sulfur dioxide passes into the atmospheric environment. By passing the peach halves into a sulfite solution after sulfur dioxide treatment, subjecting the peach to vacuum, dehydrating with essence recovery to protect the atmospheric environment, and treating again with sulfite and/or continued dehydration, the present peach process is improved. By using a no sulfite or low sulfite selective solution with blanching prior to and/or after dehydration, good quality essence recovery is possible. By peeling the fresh peaches, the peaches may be processed into dehydro-canned and other peach styles.

Dried nectarines follow a similar process to peaches. It might be noted that the essence-wax collected from a solvent wash of the fresh fruit surface is combined with the essence collected during dehydration to provide the most complete essence possible to obtain. This procedure applies to all solid foods so treated that have low or no sulfite formulation.

Dried cherries are usually of sweet varieties. The process also works well for sour cherry varieties that are suitable for dehydro-canned.

Fruit cocktail may be prepared with dehydro fruits.

Fruits for salads may be prepared with dehydro fruits.

Raisin essence-wax recovery from the surface fruit provides essence-wax and raisins that are easier to wash and dry.

Grapes may be essence-wax surface stripped, vacuumed in selective solution (with or without) sulfites and dehydrated to meet the desired grape style.

Figs, pineapples, blueberries, strawberries, persimmons, and some forty fruits and vegetables have been processed with variations of the methods given in previous paragraphs.

Dehydrated vegetables are a different class of foods than fruits, but basic similarities in processing are present.

Fresh carrots are presently washed, peeled washed, sliced, sulfited, blanched and dried. My process permits solvent washing (essence-wax removal) of the carrots before peeling, the vacuum treatment of the slices with or without sulfite in a selective solution, a blanch, and dehydration with essence recovery. The carrots can be resulfured, further dehydrated, rehydrated with selective solution, and/or directed toward a style pack such as dehydro-canned.

Fresh peas may be treated with selective solution as a soak and/or vacuum, blanched, and dried with essence recovery. The use of EDTA improves the color of the peas.

White potatoes are processed by a wash, size grade, peel (usually steam), cold water rinse, inspection, trim, and passed to size reduction such as strip slice cut, a blanch, dehydration, oil fry, and freeze.

My process offers the option of placing the whole potato in the selective solution, pulling a vacuum, and dehydrating with essence recovery to original fresh potato moisture or to drier than fresh potato moisture. If dehydrated to the original fresh moisture level, the potatoes can be dipped in the selective solution or in sulfite solution and refrigerated. If dried to a drier level than the original moisture, the potatoes may be continued to the status of a dehydro-product. The vacuum solution treated potatoes may also be returned to the french fry line to be sliced. When the whole potato is drier than the moisture of the fresh potato, the slicing loss is less, usually about 7% less. After slicing, the slices are blanched, the slices (strips) dehydrated (usually to 33% solids). The slices for fries are fried in oil, frozen. The selected solution/vacuum process improves processing efficiency, reduces loss. The essence recovered is quite different than the essence collected over boiled potatoes. Gas chromatographic comparisons show the dehydrator recovered essence with many more peaks.

Sweet potatoes, beets, turnips, tomatoes, peppers, onions, and garlic are some of the other vegetables treated with my process. Onion essence was trapped from the exit steam of a continuous dryer.

The following examples are presented for illustrative purposes and are not intended to limit the scope of the present invention.

EXAMPLE 1

A. Fresh apples were submerged in cooled ether (40° F.) with agitation. The ether removed the essence-wax from the surface of the apples. The ether was distilled from the mixture. The residual essence-wax cleaned with nitrogen gas and combined with essence collected from dehydrated apples. The combined essence-wax was also returned to dehydrated apples which significantly improved their flavor. The combined essence was added to apple juice and compared with apple juice to which commercial apple essence of equivalent strength from a juice concentrator had been added. The combined apple surface and apple dehydration essence was rated as superior to the commercial essence.

The essence-wax was also used as a coating for fresh apples which enhanced the fresh apple aroma.

A gas chromatograph comparison showed few but different peaks for the essence-wax collected from the apple surface in comparison to the total volatile essence collected during a 20% dehydration of the apples. The essence-wax is only a portion of the total apple volatiles, but a significant portion heretofore not available for commercial use.

B. Fresh sweet cherries were treated as in A. The essence-wax was collected. The cherries were then dried to 18% moisture to obtain the major portion of the volatiles contained in the cherries. The surface cherry essence-wax and dehydrated cherry essence were combined and compared with present commercial juice evaporator cherry essences and found superior.

Dried Bing cherry skins treated with ethyl ether yielded a mixture of essence-wax of 0.1–0.15% of the weight of the cherry skins. Dried cherry skins were also treated with ethyl alcohol with essence-wax yields of 0.02–0.03% of the cherry skin weight. Hexane and methylene chloride were also tested. The solvent selected depends on the end use of the cherry skin extract. Double extractions of first alcohol and then ether also have advantages. Ether is preferred. This process is an alternate to recovery of essence from peels, skins and agricultural waste in general.

C. Fresh apricots, peaches, nectarines, persimmons, grapes, raisins, plums, prunes, figs, dates, strawberries, loganberries, oranges, lemons, tangerines, pears, cherries, raspberries, blueberries, and boysenberries were tested in detail. Other fruits have been tested in general.

D. Fresh carrots were washed, passed through an ether wash, peeled and the essence-wax collected. The essence-wax was combined with essence collected during dehydration and returned to dried carrots and also to dehydro-canned carrots with observed improved flavor.

E. Fresh turnips, peppers, peas, squash, beets, onions, potatoes, peas, corn and tomatoes were tested in detail. Other vegetables were tested in general.

F. In addition to the value of the essence-wax itself, the removal permits easier processing of the fruits and vegetables in terms of penetration of the skin by soaking (usually water), vacuum treatment, peeling, cooking, blanching, and drying. Savings in time and/or energy up to 30% have been observed.

EXAMPLE 2

A. Fresh Rome variety apples were divided in two lots. One lot was washed with ether, the peel essence-wax removed. The other lot was not washed with ether. Both lots were cored and mechanically peeled. The whole peeled-cored apples were accumulated in three different protective solutions: (1) citric acid-water, (2) citric acid-ascorbic (and/or erythorbate) -water, and (3) sulfite-water. All three worked well as holding solutions.

The peeled-cored whole apples were then immersed in water solutions of fruit acid, anti-oxidant, firming agents, preservative, and EDTA. Various mixtures were used to standardize the apple quality. The container holding the solution and apples was then subjected to vacuums up to 25 inches of mercury and for periods up to ten minutes. Tests were made with sugar added to the solution. The sugar was introduced into the apple and accordingly sweetened the apple. This has not been done previously for dried foods. The concept of adding water to a product to be dried was not previously considered since the cost of removing the water would increase costs. The value of the added sugar and/or other ingredients plus the change in heat conductivity plus the value of the essence recovered plus the valve of the distilled water make the added ingredients not only more profitable, but permit for the first time standardization of sugar content (brix), fruit acid (usually citric), the brix/acid ratio, texture (hardness), color (EDTA and other chelating aids), and enzymatic and oxidation control through anti-oxidants and preservatives. Colors, flavors, and sugar substitutes (Nutrasweet) were used in batch tests.

The apple weight pick up of solution is regulated by the degree of vacuum, time held under vacuum, solution composition, and individual apple characteristics (ripeness, variety, etc.).

In my testing, I usually regulated the above process to provide a solution weight pick up between 5 and 15%. As such, 100 lbs. of apples picked up 5 to 15 pounds of solution weight.

The apples were sometimes given a quick steam or water blanch at this point depending on the apple style product to be made. Since blanching retards enzymatic and oxidation browning, the solution formulations are changed to make the vacuum solution-blanch a balanced process step. Blanching does give a whitened color change with softening of texture. However, by use of a firming agent in the solution (calcium chloride is one that works well) compensation for softening is corrected and standardized.

Peeled, cored whole apples treated with vacuum solution and both blanched and not blanched were dehydrated with essence recovery and returned to the original weight of 100 pounds. These apples were then dipped (or misted) in anti-oxidant and/or the vacuum selected solution with or without essence return and/or a sulfite dip. The whole apples were then bulk packaged and refrigerated. This type is known as fresh-chilled. The selected solution/vacuum/with or without blanch/dehydration with essence recovery plus dip prior to packaging and refrigeration provides a fresh-chilled apple that has improved quality, a standardized quality, and a longer shelf life. The quality holds up 3 to 5 times longer than present commercial whole-chilled apples.

B. The whole peeled-cored processed apples as described were also wedge sliced, ring sliced, and diced. These apple portions were placed on a mesh belt and individually-quick-frozen with carbon dioxide, film packaged, and held at zero degrees Fahrenheit. The apple portions were checked at 1, 3, 6, 9, and 12 month periods and compared with commercial I.Q.F. apple slices. My processed slices were superior in color, flavor and texture and the quality held up much better after thawing. Pies prepared from my slices were superior to pies prepared from commercial packages of I.Q.F. apples. My slice firmness and apple flavor was significantly better than the commercial I.Q.F. apple pies and even fresh apple pies.

C. The whole-peeled-cored processed apples as described (selective solution/vacuum/blanch or no blanch/dehydrated/essence recovery/with or without returned essence) were wedge sliced, ring sliced, and diced. The apple portion mixed with sugar (usually a 7 to 1 ratio) with and without added essence, were frozen, and held at zero degrees Fahrenheit. The frozen apples were thawed, made into pies, and compared with commercial frozen apples at 1, 3, 6, 9, and 12 month periods. My apples were superior in color, flavor, and texture. The EDTA in the selective solution promotes the natural apple color.

D. The whole cored-peeled processed apples as described above (selective solution vacuum treatment through dehydration) were sliced, steam blanched, and packed into 303 sized tins with and without essence, and the tin (can) sealed and pasteurized. The cans were rapidly water cooled to room temperature and compared against commercial canned apples at 1, 3, 6, 9, and 12 month periods. The color, flavor, and texture of my canned apples were superior to other commercial canned apples. Again, the selective solution enables augmentation of the fresh apple's chemistry (sweetness/tartness/texture). An apple on the outside of the tree ripens differently than an apple on the inside of the tree. Apples ripen differently from tree to tree and from orchard to orchard. A selective solution with vacuum and associated processes provides a means to reduce these variations and actually improve the apple quality.

E. The whole peeled-cored apple when subjected to vacuum is not as easily or completely penetrated as with a smaller portion such as a slice or dice. Accordingly, the whole peeled-cored apple was sliced and/or diced before rather than after subjecting to the vacuum in the selective solution. After which, the processes were the same. The dehydration rate is different. The essence and distilled water remain the same high quality.

F. Apple portions (whole-slice-dice) processed by the described variations were processed nearly identically except that the degree of dehydration was extended.

After 10–15% of the moisture (water) has been evaporated from the apple, the apple portion has given up its volatiles (essence). Some of the apple portions were sulfited at this point and dehydration continued. This procedure would enable present sulfiting apple processors to delay the sulfiting step until the revenue rich essence has been reclaimed. For no sulfite apple portions, the dehydration continued. After dehydration, a decision is again made as to sulfuring or continuing processing to a specific style of apple.

G. Fresh and frozen apple portions (slices and dices) were processed by the described variations and without the presence of sulfite with the added dimension that the apple portions were dried to one-half their original weight. The apple slices received a quick blanch and were canned (pasteurized). The canned apples were held one year. Cans were opened, water added to rehydrate the apple slices, and pies baked from the rehydrated apples. The apple slices and apple pies were compared with commercial apple slices and pies and found superior. The apple essence provides the best apple aroma to the slices when introduced to the empty can prior to being filled with the apple slices. Disodium EDTA may also be added prior to canning. Since dehydration is usually more extended than desired, say 55% of original weight, a 5% make up dip solution (usually the selective solution in which the apple slices were subjected to vacuum, adds water to make this fine adjustment to 50% of original weight. The selective solution can be enhanced with additional essence, EDTA, and so forth. These canned apples, one can being equivalent to two cans of regular fresh canned apples, are known as dehydro-canned.

H. Apple portions (slices-dices-etc.) treated as described were frozen. The apple portions are known as dehydro-frozen. The portions were thawed, rehydrated, and made into pies at 1, 3, 6, 9, and 12 month periods. The dehydro-frozen were superior to the comparison commercial pies. Again, a selective solution used as a dip to standardize the moisture content enables essence and other solution ingredients to be adapted to assure superiority of quality.

I. The most common commercial dried apples are those preserved with high sulfur content (over 1,000 ppm) and a moisture content of about 24%

In drying the apple portions with my process to 24%, I used no sulfite in one batch and high sulfite in another batch. My process uses sulfite more efficiently than present commercial methods since the sulfite is introduced internally. One other major difference is that the color from my process is natural, even though high sulfite is used. The color from present commercial methods is a bleached, unnatural white. Apple portions from my process also rehydrate more quickly. My process produces a superior dried apple portion.

J. Apple portions treated as described were dried to 8–15% moisture. Low moisture apple portions are 5% moisture. The 8–15% moisture portions were dried in a vacuum dryer and or freeze-dried to 3%. Again, natural color, flavor, texture, and quick rehydration distinguish apples from my process from the commercial process of slice, dip in sulfite, and dry.

K. Natural dried apple portions (whole-slice-dice-etc.) are apples that have been peeled-cored-sliced and dehydrated with no anti-oxidants or preservatives. These dried apple portions are oxidized, brown in color, and flat in taste. They are used for manufacturing. Selective solutions, vacuum, and other points of my process are not used except for essence recovery. The essence recovery was adapted to the dehydration of fresh apples and the essence was of excellent quality, superior to commercial apple essences presently on the market, though no apple essence prepared from dried apples has been collected previously.

L. Essence recovery is an associated, almost by-product, part of my process.

I placed charcoal traps in continuous belt dehydrators, drying tunnels, and various drying units. The collected essences have been of superior commercial quality.

The apple portion, in drying, gives off moisture (water) in the form of vapor that may be described as steam. The steam is hot. It contains heat and the volatiles from the apple. The charcoal removes the volatiles (essence) and the steam (heat and water) passes through the charcoal. Later, the essence is removed from the charcoal with an option to use it on the processed products or for separate essence sale. I have recovered these described essences.

M. The steam (heat and water) that passes through the charcoal was collected. The water was, in effect, distilled (it had been boiled—converted to steam—and cooled, converted to liquid). The steam (water) had also passed through a charcoal filter. This water is bacterially pure and meets the standards for drinking water and bottled water. My tests show this water is superior to commercial bottled waters in terms of overall purity, chiefly solids. I, hereby, claim the licensing rights for water produced by my essence process.

N. My essence recovery system enables me to adapt to all types of solid food drying units with steam-volatile exits, as described previously.

a—Multi screens were used in various units.

b—Different adsorbent materials were used (charcoal, resin, carbon) with only one adsorbent or selectively with different adsorbents per screen.

c—An adsorbent (carbon) specific to sulfur dioxide and sulfites was used.

d—The use of different solvents and/or steam was used. Ether was preferred. The essence recovery system varies as to the product, the process, and the equipment.

O. Apple essence is a commercially established product due to the earlier development of apple juice concentrate and other fruit juice concentrates such as grape, orange, grapefruit, and so forth. In the preparation of apple juice concentrate, four gallons of apple juice has three gallons of its water content evaporated. When apple concentrate is purchased, the three volumes of water that were evaporated are added back to the juice. However, when the three gallons of water were evaporated, they were evaporated as steam-heat-and volatiles (essence).

The juice evaporators (concentrators) that collect the volatiles do so in terms of steam distillations. With apple juice, the first 10% of the moisture (steam) boiled off the juice contains for all practical purposes all the essence. So, with the four gallons of apple for which we need to boil off three gallons of water, we need to collect only the first 10% of the steam (water) to boil off. This means only 0.3 of a gallon needs to be set aside for essence. The remaining 2.7 gallons of steam is discharged. It has partially no essence to recover. Now, the 0.3 gallons of water-and weak essence is reboiled again. The first 0.1 gallons of the steam-essence mixture contains the essence. The remaining 0.2 gallons of steam has no essence. This is basically the type of essence recovery unit used with juice evaporators. There are limits with distillation. The juice evaporator essence recovery units are able to recover essence of only 100 to 300 fold strength, usually 150 fold. The term, fold, shows the relative strength of the essence. For instance, 150 fold essence would mean that 1 gallon of the essence would be added to the equivalent of 150 gallons of single strength apple juice. A 200 fold essence would have one gallon of essence added to 200 gallons of single strength apple juice. The essence from the juice evaporator essence recovery system is actually about 99.9% water and 0.1% essence. It is accordingly a very watered down essence. This process is established in the juice concentrate industries. It has some advantages. It collects essence and returns it (as an option) to the juice concentrate as the concentrate is being run. A disadvantage is that the collected essence is so highly (99%) diluted with water.

a—In collecting essence from the apple portions during dehydration, it was found that the first 10–15% of the evaporated steam-heat-volatiles (essence) contained all the essence. Additional essence collection from later steam-heat-volatiles was found to be insignificant, very few volatiles. This is for apples. Each fruit and vegetable is different. Each has different thresholds.

By taking my essence from dried apples, diluting it with water to the equivalent 150 fold commercial apple essence available from juice concentrators and adding the essence back to apple juice, the essence from the dried apples was superior to the essence from the apple juice concentrate processor. Chromatographic comparisons found more peaks with the dried apple essence than the apple juice derived concentrate essence. This indicated more flavor components in the dried apple-essence.

b—The apple essence from the dried apples was used in previously discussed apple products in comparison to apple essence from apple juice concentrators. The dried apple essence was superior and so identified in each comparison.

c—The dried apple essence was combined with essence collected from the ether washed fresh apples. The apple flavor was again improved.

d—While apple juice concentrator companies in the U.S. are concerned chiefly with returning essence to the juice concentrates as it is being processed, the foreign producers exporting to the U.S. collect their essence in 50 gallon drums to ship to the U.S. or other countries. It is to be remembered that this is commercial essence that is a minimum of 99.9% water and less than 0.1% essence.

I have taken the watery essence of the juice concentrators and passed it through my charcoal trap thereby extracting the approximate essence and reducing the water-essence volume by about 99%. I enter this as a separate claim.

e—As I found with dehydration of apples, the steam-heat-volatiles pass through the charcoal leaving the essence in the charcoal. The steam-heat continues to be condensed and is claimed as a separate product, distilled natural organic charcoal-filtered water.

I also make this same claim for the steam-heat that passes through the juice evaporator company. These companies extract the essence and pass the condensate (distilled) water into process or discharge lines. I have tested many samples of the distilled water from juice concentrates. All samples were pure and meet water bottling standards though the volatiles have not been controlled. I claim the idea to use the distilled water from the juice evaporators as a separate commercial bottled water product (distilled) with optional essence inclusion.

f—Distilled water has many uses. One use is electrolysis from which hydrogen and oxygen gases are derived. The distilled water provides a pure base that may be treated with an electrolyte and more easily controlled in electrolysis. The gases may be used for many purposes. Hydrogen and oxygen have established commercial uses. The use of distilled water from juice evaporators for use in electrolysis is hereby part of my claim.

g—In a commercial sense, all present essences are heavily watered essences. With such diluted essences, uses are limited. My essences are 100% pure. New uses and applications are possible. This is the first time that commercial essence or more convincingly pure essence has been collected from dried apples, fruits, and vegetables. As a new product, it is so claimed.

EXAMPLE 3

Frozen fresh apples as well as other fresh frozen fruits or vegetables may be dried. Frozen I.Q.F. apples, carrots, apricots, and peaches were blanched, dried to 50% of weight with essence recovery using a two step drying procedure. One hour at 150° Fahrenheit followed by 130° to 140° F. temperature until 50% of original fresh weight. The frozen/dried fruits were refrigerated. Essence was returned in a rehydration make up solution to finalize the dehydration level. Temperature and time is varied as to product, variety, ripeness, and texture.

The individual-quick-frozen apples (and apricots and peaches and cherries) were dipped in my selective solution and dried with essence recovery to 18% moisture. The selective solution was used as a dip to rehydrate the apples (apricots/peaches/cherries) to 22–24% moisture.

The point being accented is that the essence recovery system provides a method of returning lost essences to dehydrated solid food.

EXAMPLE 4

A. Fresh prune plums were washed (water/detergent), placed on trays, and dried in a dehydrator tunnel for 16 hours at approximately 165° Fahrenheit with forced hot air circulation. A mesh door with approximately two inch rib spacers was filed with adsorbent charcoal and placed at the steam-heat-vapor exit. A supplemental exhaust fan was placed behind the screened door to help pull the steam-heat-vapor through the charcoal. This is an improvement in dehydrator tunnel efficiency and so claimed. The essence collected in the charcoal was extracted with ether per described procedure. The essence was added to prune juice, prune juice concentrate, and prunes. The essence provides an improved flavor difference. The essence was also added to plum wine in a comparison test with commercial plum essence. The dehydrator prune plum essence provided a fresher more distinctive flavor than the commercial essence. Essence comparisons are weighed toward my essence since comparative essences are water based and highly diluted and limited in use because of the volume of water-essence that must be added.

B. Essence-wax was removed from the surface of fresh prune plums by ether wash and distillation as described. The essence-wax was combined with essence from the dehydrator collected during the drying of the fresh prune plums. The combined essences-wax was used to coat dehydrated prunes of 33% moisture and enhanced the shine (luster) and aroma of the prunes.

The combined essence was used in canned prunes. The essence was added to the empty can before filling. Essence mellows and improves the taste.

EXAMPLE 5

Fresh apricots were halved, pits removed, the halves placed on trays and sulfured with sulfur dioxide gas as is done with the usual industrial procedure. Apricot halves are then, per industrial process, moved to an outside open area known as a dry yard for atmospheric drying for a 3 to 5 day period. However, after sulfuring, I placed the apricot halves in my selective solution (citric acid/sodium erythorbate/EDTA/and, in this case, 2% sodium metabisulfite and dried in a dehydrator tunnel. This bypassed the outside drying yard.

I, also, placed the sulfited apricot halves in my selective solution and subjected the apricots to vacuum. After which, the apricots were dried in a dehydrator tunnel.

I, also, used alternative processing in that depending on the degree of penetration with vacuum, I supplemented the oxidation resistance with blanching and then dried. These are variations of present processing.

Since essence is lost in the initial drying, my new process places the halves in selective solution preferably with low or no sulfites, subjects the halves to vacuum or soak, and then possibly a blanch depending on the apricot vacuum solution pick up, followed by a predetermined amount of dehydration with essence recovery. Apricots vary from green, not ripe to very ripe and from small to large. Industrial practice for dried apricots is not to separate sizes and/or ripeness until after the apricots are dried. My process works best if these separations are made before the commencement of processing. Using the industrial practice, my unsized apricot halves were vacuum treated in selective solution, blanched with one batch and no blanch with a second batch, and dehydrated with essence recovery and then followed the general procedure as outlined with apples.

A portion of the apricot halves were dried to 70%, 60%, and 50% of their original weight. The essence is completely removed at the 70% level. Chromatographic comparisons showed little variation in 50%, 60% and 70% peaks. The essences of 70%, 60%, and 50% were of good commercial quality and in flavor comparisons with commercial apricot essences were uniformly superior. Apricot essences were prorated as to quantity and added to apricot nectar, apricot pie prepared from dried apricots, and canned apricots.

The 70% 60% and 50% dried apricots offer the optional process of being sulfured. I dipped portions of the 70% 60% and 50% in 2 to 3% sulfite solution. I, also, placed the three variables in boxes and on trays and treated them with sulfur dioxide gas. The apricots were then dried in drying tunnels and in the outside atmospheric dry yard.

A portion of the 50% dried no sulfite apricots were canned with returned essence in #303 and #10 cans as dehydrocanned.

EXAMPLE 6

Fresh peaches were processed in identical fashion to the previously described apricots. In addition, peaches were steam peeled, placed in selective solution (no sulfite), subjected to vacuum, dried to 50% of original weight, blanched, and canned (pasteurized). Peach essence was introduced into the empty can prior to filling. EDTA promotes the peach color. The peach essence was compared with commercial peach essence and found predictably superior. Freestone and Clingstone peaches were tested.

EXAMPLE 7

Fresh pears were halved, treated with sulfur dioxide gas, placed in my selective solution with sulfite increased to 2-3%, subjected to vacuum, and one part dried in a dehydrator and another part dried in an outside atmospheric dry yard. Pears do not readily pick up sulfur dioxide gas nor do pears dry quickly. My process doubles the speed of sulfite pick up, hastens drying, and provides options to dry in dehydrators rather than outside environmentally exposed dry yards.

Fresh pears were halved, peeled, cored, immersed in my selective solution (no sulfite or low sulfite), subjected to vacuum, and dried with essence recovery to 50% of original weight. The pears were then blanched and placed in #303 cans containing the recovered pear essence with and without EDTA followed by pasteurization. These dehydro-canned pears were compared at 1, 3, 6, 9 and 12 month periods and were excellent.

Fresh pears were also halved, cored, peeled, placed in no sulfite solution, subjected to vacuum, and dried with essence recovery to 50% of original moisture as with the dehydro-canned except that these pears were blanched, sulfured, dried to 24% moisture and chocolate coated as a confectionery fruit candy.

A second portion was dried directly to 24% moisture, given a quick hot water blanch (preserve and reduce stickiness) and frozen.

The recovered pear essence was used in pear nectar, canned pears, and pear wine in comparison to commercial pear essence in equivalent amounts. The essence from the dried pears was more pronounced in all cases. The pear flavor was more distinct. It should be pointed out that the essence recovered from the charcoal by solvent (ether) has been used for comparisons. Essence recovered from the charcoal by steam is a watered incomplete essence that I have used as a dip after dehydration to bring the too dry, say 20% moisture, up to the desired standard of 24%.

EXAMPLE 8

Fresh tomatoes were both ether washed and not ether washed. The essence-wax was collected. The tomatoes were then divided in three portions, one part was steam peeled, another lye peeled, and a third part hot water dipped with mechanical and hand peeling. After peeling, the whole tomatoes were washed and put through a citric acid dip for the lye peeled tomatoes; the others were washed and passed through a cold water dip. The whole tomatoes were next put into my selected solution (no sulfite) and held 3 to 5 minutes and/or subjected to vacuum. The whole tomatoes were then placed in the dehydrator at 150° Fahrenheit and dried with essence recovery to 70% 60% and 50% of original weight. Tomato essence, as with most vegetable essences, is not as characteristic as with fruits such as cherry and apple.

Some whole tomatoes of the 70%, 60%, and 50% of original weight were transferred to a drum dryer and dried to 5% of the original fresh tomato weight.

A portion of the whole 70%, 60% 50% dried tomatoes were rolled down a cutting bed that placed cuts in the tomato about one-quarter inch deep and about three quarters of an inch apart. The slight cuts aided the drying rate by venting moisture from within the tomato. It is an option.

A portion of the 50% of original weight whole tomatoes were flat pressed to resemble a hamburger. The flesh and seeds stay together at this dryness. This would be a manufacturing grade.

A portion was dried to 25% of original weight, sliced, and the drying continued to 5% of original weight.

A portion of whole tomatoes was dried to 6% of original moisture. A part of these whole tomatoes was dipped in sulfite solution and given a quick dry to remove the dip solution moisture. A part was dipped in my selected solution (no sulfite) and given a quick dry to remove the water from the dip.

The dried tomatoes were compared with other dried tomatoes and found equal or slightly superior. The tomato essence was added to the empty can prior to filling with tomato juice. Tomato essence was also added to the empty can of spaghetti sauce prior to filling the can. The tomato essence was also mixed with olive oil and spices as a flavor aid for a dried tomato snack product.

Dried tomatoes (about 3% moisture) were passed through a dicer and then a grinder to produce tomato powder. The powder was added back to tomato soup with the tomato essence and produced a more flavorful soup.

The condensed steam that passed through the charcoal was tested for hardness, bacteria presence, and bottled water suitability and found to be excellent. The condensed steam is indeed charcoal filtered organic distilled water.

Tomato juice was concentrated in a commercial-type evaporator with essence recovery. The condensate was collected and met the criteria for distilled water. A sample of the water was bottled and was competitive with commercial bottled distilled water. I claim this idea as a new invention. A sample of the distilled water (condensate) was mixed in a glass vessel with sulfuric acid and the mixture placed in an electrolysis unit from which was collected and discharged hydrogen and oxygen gases. The hydrogen was used to regenerate an ion exchange column; the oxygen to lower the organic solids (B.O.D.) in waste water. There is, of course, an established market for hydrogen and oxygen.

EXAMPLE 9

Dried potatoes are similar to apples in that there are many potato styles. My process provides a method of placing enhancement ingredients in cells and pores of the food product. This selective solution enables the food product to go through the drying process with a minimum of quality damage. Quality damage is in terms of the difference between the fresh, unprocessed potato and the dried potato. In some aspects, quality is improved. Natural color is improved by placing EDTA in the cells and pores of fruits and vegetables by the vacuum process. While my selective solution has provided a selection of ingredients to use in combination for each product and its style, dried potatoes use additional ingredients such as added color, flavor and preservatives. My invention concerns the use of vacuum to place the ingredients in the potato and provides quality improvements from ingredients such as EDTA. The added cost of the water-ingredient solution (and its evaporation) is paid for by use or sale of the recovered essence, improved potato products, distilled water and new potato products. With essence, steam occurs. The charcoal filtered steam is charcoal filtered organic distilled water and has a direct sales value for bottling sale or for manufacturing use (converted to hydrogen and oxygen gases is one possibility).

Fresh potatoes were washed, steam peeled with and without sodium bisulfite, rinsed in cold water, trimmed, placed in a selective solution with variables (one with EDTA, ascorbic acid and citric acid; another with EDTA, sodium erythorbate, citric acid, and calcium chloride) subjected to vacuum and dehydrated with essence recovery to 70% 60% and 50% of the original weight. The color and flavor held well for all three moisture variables. These were whole potatoes. The potatoes were rehydrated in part with selective solution, placed in bulk containers, and refrigerated. These whole potatoes are known as chilled-peeled whole potatoes.

I, also, sliced the chilled-treated whole potatoes, blanched, dehydrated, and fried the slices in oil.

I, also, canned small peeled, selective solution treated potatoes under vacuum, which were dehydrated to 50% of fresh weight potatoes with a blanch prior to canning (pasteurization). Essence was returned. These are dehydro-canned potatoes.

Vacuum treatment offers an option to sulfite, and, also, better sulfite treatment.

Dried potato essence was returned to dried potatoes, potatoes prior to frying, and to potato soup base. The essence provides a potato flavor increase.

EXAMPLE 10

Fresh carrots were washed, peeled, and placed in selective solution (EDTA, sodium erythorbate, and citric acid), subjected to vacuum of 25 inches, held 10 minutes under vacuum, and dried to 24% moisture for the first portion with drying continued to 5% for the second portion. Drying was at 130° to 150° F. Essence was recovered during the drying. The color was bright, good shine. Carrots were rehydrated with and without essence return. Some dried carrots were treated with sulfur dioxide gas. Other dried carrots were dipped in sulfite solution.

(1) In summation: My invention introduces new and improved processes that may be used separately or in combination with agricultural products. Some of the functions of my process are: (a) The recovery of essence-oil-fat-wax from the surface of agricultural products with particular emphasis for fruits and vegetables; (b) the use of a long soak and/or vacuum treatment in a selective solution to place functional ingredients within the food cells and pores; (c) the blanch option as a separate or combination process; (d) controlled dehydration and rehydration with essence and distilled water recovery; (e) the treatment with or without sulfites, blanching, selective solutions, vacuum, dehydration, rehydration, with and without added essence to form improved and new products.

(2) A system for the recovery of essence-oil-fat-wax from the surface of solid food and agricultural products such as fruits and vegetables by use of a solvent (ether preferred, hexane, methylene chloride, ethyl alcohol, etc.) wash with separation of the essence-wax by distilling off the low boiling (ether) solvent. The essence-oil-fat-wax is cleaned with nitrogen and stored under refrigeration. The essence-wax may be combined with the essence collected during the dehydration of the same food product to form a complete essence. The essence-wax may be used separately. The essence-wax may be sold on the commercial market. This fraction of the solid food (agricultural product) essence has not been previously available. My method makes these lost volatiles available for use and enhancement of solid food and agricultural products.

(3) a—The prolonged soak and/or vacuum treatment of the food product in a selective solution with and without the option of blanching prior to dehydration permits elimination or reduction of the use of sulfites. This permits the recovery of a sulfite-free, superior essence. The dehydrated products, sulfite-free, may be processed into various food styles.

b—The use of sulfites in the selective solution more efficiently places sulfites in the cells of the food product and better controls the sulfite process. My process can be used with sulfur dioxide or sulfite treated food both before and/or after the soak/vacuum process. Essence recovery of a sulfite-essence mixture protects the environment from sulfite discharge and permits the sulfite-essence to be used for non-food or manufacturing purposes. The improved sulfuring-processing reduces processing time for products such as pears and provides options as to use of drying processing units or outside atmospheric drying.

c—The use of the long soak/vacuum process reduces drying time because of the removal of air and replacement with liquid within the food cell. In combination with blanching, drying times can be reduced as much as 30%.

d—Color, flavor, texture, and the general food product can be improved, standardized, and controlled by selective use of ingredients in the vacuum solution.

(1) The acidity (pH) may be controlled with fruit acid such as citric.

(2) The sweetness may be controlled by addition of sugar or artificial sweeteners.

(3) The combined sweetness/tartness index (known as brix/acid ratio) may be controlled by the amount of pick up of sugar and acid by the food product when subject to vacuum. The pick up improves and lessens variation differences.

(4) Color control in providing resistance to oxidation and enzymatic browning by use of anti-oxidants such as ascorbic acid, isoascorbic acid, and sodium erythorbate.

Color control, promotion, and enhancement by use of EDTA as a chelating agent.

(5) Texture control by use of firming agents such as calcium chloride and/or calcium hydroxide or similar agents.

(6) Preservatives may be added to protect the product during processing and/or after processing. Sulfites in one of the Federal Food and Drug approved forms have been the most common.

Potassium sorbate is another preservative.

Vegetables, such as potatoes, have other preservatives (BHT, SAPP; etc.).

(7) Flavor added to the vacuum and/or soak solution as natural (returned essence) or artificial flavor.

(8) Color can be added to the vacuum solution as natural or artificial.

(9) Dried foods and dried agricultural products processing is based on the concept of not to add water since it costs money to evaporate any added water. My process changes the character of the food product so that the added water with its functional ingredients is a profitable and quality enhancement concept. As a first, many foods, apples, for example, can have their sweetness (brix) and tartness (acid) standardized.

(10) The selective ingredients provide protection and control of product not only during the processing, but also after the processing in terms of better keeping quality and longer shelf life.

(11) The processing that occurs affects the activity and function of the ingredients as placed in the food product cells. Blanching affects the color and retards oxidation. Blanching changes the food products texture (softens it). As such, a balance of vacuum solution treatment and blanching is frequently the best processing balance in terms of quality and economics.

(4) Dehydration of the food product after soak/vacuum/optional blanch is a matter of degree of drying and the associated essence recovery. A product such as apples must have ten (10) percent of its original fresh weight evaporated to strip the peeled-cored-sliced apples of their essence. At this point, and it varies per food product, a decision as to the next processing step needs to be made. Dehydration equipment comes in various types and styles: continuous belt dryers, drying tunnels, drum dryers, freeze-dryers, kiln rooms, microwave, solar, and many other variations. Wherever steam-heat-volatiles escape, my essence process can be used.

(5) An essence recovery system for solid foods with the following additions are given in a, b, c, d, e, and f:

a—Essence recovery from a solution of water-essence which is typically produced by the present industrial (apple, grape, orange, etc.) juice concentrate companies.

b—Commercial juice concentrate companies (apple, orange, grape) remove the volatiles (with much water dilution) from the steam (water-heat-volatiles) and pass the condensed water (minus some heat and all volatiles) into discharge lines. I claim the license right of this process controlled distilled water as bottled water and/or bottled distilled water as a new product from food with the added refinement of permitting no volatiles, a few volatiles or all volatiles.

c—Since my essence is recovered by passing the steam (water-heat-volatiles) through charcoal, I claim my recovered water (with the essence removed) as natural organic distilled charcoal filtered water, a new product to be sold as bottled water with a few, all, or no volatiles.

d—Distilled water is a poor conductor of electricity. However, it is an excellent base to which to add an electrolyte and produce hydrogen and oxygen gases. I claim the licensing right of hydrogen and oxygen gases produced from distilled water from agricultural evaporator and/or essence recovery units.

e—My essence recovery unit can be adapted to blanchers, grinders, mixers, kettles, and process equipment in general. The essence recovery is not only in terms of essence, but also in terms of containment of volatiles passing into the atmosphere.

f—Volatiles (essence) may be classified as full essences, essence fractions, or diluted full essence or diluted essence fractions. In general, a full (complete) essence is one that has approximately 90% of the chemicals that make up the volatiles of the food product. For example, if the apple essence is made up of 100 separate chemicals, we need 90 of these separate chemicals to have an acceptable nearly complete essence. We not only need 90 of the 100 chemicals, but, also, quantitatively, we need 90% of each of these separate chemicals. My essence recovery system used the dehydration process to recover pure essence (no dilution by water). In order to recover all the essence, all the volatiles have to be released from the food product. With dried apples and/or apple juice, you need to evaporate roughly 10% of the weight and/or volume. If you evaporate 2% or 5% of the weight, you have an essence fraction. Each product requires a different level of evaporation. Some products must have 30% of their volume evaporated to yield (make available) all the essence (volatiles).

Most commercial essence recovery units are used with concentrated fruit juice operations such as orange, grape, apple, grapefruit, tomato, and so forth. These essence recovery systems recover the full (complete) essence in part of the evaporated steam. As such, these companies have water diluted full-essences. An essence about ninety-nine point nine (99.9) percent water and one tenth (0.1) percent essence. In general, you have to use a minimum of a thousand gallons of this watery-commercial essence to equal one gallon of essence from my process.

Fragmented essences are parts or pieces of the complete essence. In terms of apples, it would be a fraction or part of the total volatile chemicals that make up the essence. You can smell the fresh apple. This is a fraction of the total volatiles. If you place fresh apples in a vacuum chamber, subject the apples to vacuum, and collect the essence, you will have only an essence fraction. When this fraction is added back to apple juice or canned apples, it causes no change in apple flavor. When subjected to chromatographic analysis, you find only a few of the volatile chemical peaks as compared to a full dehydration-derived multi-peaked apple essence. Additionally, essence fragments are not in proportion with the total essence and give distorted evaluations. For instance, ethylene is a major component of the aroma of the fresh apple. It's effect is to hasten the ripening of the apple.

Passing gas, such as nitrogen, over fresh apples does not change the situation. The most you can obtain is an insignificant fraction of the total essence. You must evaporate 10% of the total apple to release all the volatiles to be recovered. With this type of gas-essence reclamation, a processor would pick up a fragmented watery essence due to the water in the air that is condensed.

The volatiles from the apple surface are not given up freely by passing gas over the product surface. The apple surface is protected with an essence-oil-fat-wax natural covering. However, by stripping the essence-oil-fat-wax from the surface with a solvent and distilling off the solvent, one recovers a significant fraction of the essence plus flavor supporting chemicals in the form of oils-fats and waxes. This fraction plus the volatiles collected from the drying of 10% of the apple slice weight gives a complete essence. The first available complete essence to this time in history.

When essence is recovered from the charcoal by steam rather than using solvent, it is a diluted, watery essence. A watery essence would be used as a dip in my process where both water and essence are added back to the product. However, my complete essences (volatiles) recovered during dehydration are 100% essence, no water.

(6) Essence recovery adaptation to continuous belt dryers, drying tunnels and drying units with the following specifics.

a—The use of multi screens in the essence recovery unit.
  (1) One adsorbent material on all screens.
  (2) Different adsorbent materials on different screens.
  (3) The use of an adsorbent specific to sulfur dioxide gas and/or sulfites.
 b—The use of different solvents to remove the essence from the adsorbent.
  (1) Ether is preferred.
  (2) Methylene chloride.
  (3) Hexane.
  (4) Halogenated hydrocarbons.
  (5) Ethyl alcohol.
  (6) Similar organic solvents.
  (7) Steam.

7—Improved and new products are possible by use of my methods with and without the return of the captured essences.
 a—Improved-Chilled-Dehydro products have been soaked and/or subjected to vacuum in my selected solution (a composite in general selected from my previous listing), possibly blanched, dehydrated to original food product moisture with essence recovery and optional essence return. The product is then refrigerated.
 b—Improved-I.Q.F.-Dehydro food products. These products have been processed as in (a) and then individually-quick-frozen.
 c—Improved-Frozen-Dehydro food products have been processed as in (a) filled into containers, and frozen as straight pack (no added ingredients) or with added ingredients such as sugar and/or syrup.

8—Products as discussed in 7a, b, and c are not returned to the original fresh product moisture, but are held at drier, lower moisture levels, and used as chilled, I.Q.F., and frozen products.

9—Improved-Canned-Dehydro is dried to a level of approximately 50% of the fresh weight. The product may be blanched prior to filling into cans or suitable packaging such as film. The following products were dehydro-canned with and without the essence returned: Potatoes (white and sweet), carrots, beets, peaches, cherries, pears, grapes, pineapples, apricots, fruit cocktail, apples, peas, corn and fruits for salad. This process enables the equivalent of two cans of fresh food product to be placed in one can. The food products at this dryness level may also be chilled and frozen as described in 7a, b and c.

10—Improved-Dehydro or Improved-Dried refers to the present standardized commercial food products. Dried apples would be 24% moisture and/or a low moisture of below 5%. Essence may or may not be returned. The products may also be handled as in 7a, b, and c and 8 and 9.

11—Improved-Dehydro products may be dried selectively as freeze-dried or vacuum-dried or as flakes or powders with or without essence recovery or components as described in the selective solution. Apples reduced to a puree type slurry for products such as baby food were drum dried to dried baby food consistency with the essence and distilled water recovered. The distilled water was used to reconstitute the baby food for eating.

12—The discussion has centered on improved quality and more efficient processing. Waste agricultural products may be better utilized with my invention. Oranges are halved and pressed for juice. Much of the peel is dried for sale as cattle feed. My charcoal adsorbent placed on the drier collects these lost volatiles. The natural organic water is also collected as a separate product. Much of the agricultural production is consigned to waste. My process enables additional revenue to be recovered from this waste. Apple peels, grape pomace, and similar products have increased valve.

What is claimed is:

1. A process for treating a solid food product having water soluble and water insoluble volatiles with the water insoluble volatiles having volatiles soluble part in ethyl alcohol and part in ether, said process comprising:

cutting the product into pieces;

placing the product pieces in a volume of water containing an anti-oxidant;

drawing a vacuum on the product pieces in said volume of water to pull air out of the cells of the product pieces;

releasing the vacuum to cause water and said anti-oxidant to enter the cells of the product pieces;

heating the product pieces to dry the pieces and to generate steam and drive off the water soluble and water insoluble volatiles therefrom;

directing the steam and the volatiles through an adsorbent to remove the water soluble and water insoluble volatiles by adsorption;

passing steam through the adsorbent to remove the water soluble volatiles from the adsorbent and to produce water with water soluble volatiles mixed therewith when the steam is condensed;

passing ethyl alcohol through the adsorbent to remove the alcohol soluble, water insoluble volatiles from the adsorbent and to produce ethyl alcohol with ethyl alcohol soluble water insoluble volatiles mixed therein;

passing ether through the adsorbent to remove the ether soluble, water insoluble volatiles from the adsorbent and to produce ether with ether soluble water insoluble volatiles mixed therein;

distilling the ether from the ether and volatiles mixture to leave the volatiles;

condensing the steam and stripping said steam of its volatiles as natural adsorbent-filtered water;

treating the adsorbent-filtered water to generate hydrogen and oxygen gases by electrolysis; and adding the water mixed with the water soluble volatiles to the dried product pieces to leave the product pieces with said volatiles returned to the product pieces.

2. A process as set forth in claim 1, wherein the adsorbent is charcoal.

3. A process as set forth in claim 1, wherein the food product is taken from the group consisting of vegetables and fruits.

4. A process as set forth in claim 1, wherein the anti-oxidant is citric acid.

5. A process as set forth in claim 1, and further comprising the steps of canning the dried product pieces to form a dehydro-canned food.

6. A process as set forth in claim 1, and further comprising the step of freezing the dried product pieces to form a dehydro-frozen food.

7. A process as set forth in claim 1, wherein the volume of water includes a fruit acid, a chelating agent and a calcium firming compound.

8. A process as set forth in claim 1, and further comprising the step of adding sugar, color and flavoring to the water before drawing said vacuum.

9. A process as set forth in claim 1, wherein the food product is a product taken from the group consisting of apples, prunes, apricots, peaches, nectarines, tomatoes, pears, grapes, strawberries, carrots, and oranges.

10. A process as set forth in claim 9, wherein the food product is a prune product.

11. A process as set forth in claim 9, wherein said food product is an apple product.

12. A process for treating a solid food product having water soluble and water insoluble volatiles with the water insoluble volatiles having volatiles soluble part in ethyl alcohol and part in ether, said process comprising:

placing the product in a volume of water containing an anti-oxidant;

drawing a vacuum on the product in said volume of water to pull air out of the cells of the product;

releasing the vacuum to cause water and said anti-oxidant to enter the cells of the product;

heating the product to dry the product and to generate steam and drive off the water soluble and water insoluble volatiles therefrom;

directing the steam and the volatiles through an adsorbent to remove the water soluble and water insoluble volatiles by adsorption;

passing the steam through the adsorbent to remove the water soluble volatiles from the adsorbent and to produce distilled water with water soluble volatiles mixed therewith when the steam is condensed;

passing ethyl alcohol through the adsorbent to remove the alcohol soluble, water insoluble volatiles from the adsorbent to produce ethyl alcohol with ethyl alcohol water insoluble volatiles mixed-therein;

passing ether through the adsorbent to remove the ether soluble, water insoluble volatiles from the adsorbent to produce ether soluble water insoluble volatiles mixed therein;

distilling the ether from the ether and volatiles mixture to leave the volatiles; and condensing the steam which is stripped of its volatiles as natural adsorbent-filtered distilled water.

13. A process as set forth in claim 12, and including treating the adsorbent-filtered distilled water to generate hydrogen and oxygen gases.

14. A process as set forth in claim 12, wherein the adsorbent is charcoal.

15. A process as set forth in claim 12, wherein said food product is an apple product.

16. A process as set forth in claim 12, wherein the food product is taken from the group consisting of vegetables and fruits.

17. A process as set forth in claim 12, wherein the anti-oxidant is ascorbic acid.

18. A process as set forth in claim 12, wherein the anti-oxidant is citric acid.

19. A process as set forth in claim 12, and further comprising the steps of canning the dried product to form a dehydro-canned food.

20. A process as set forth in claim 12, and further comprising the step of freezing the dried product to form a dehydro-frozen food.

21. A process as set forth in claim 12, wherein the volume of water includes a fruit acid, a chelating agent and a calcium firming compound.

22. A process as set forth in claim 12, and further comprising the step of adding sugar, color and flavoring to the water before drawing said vacuum.

23. A process as set forth in claim 12, wherein the product is a prune product.

24. A process as set forth in claim 12, wherein the food product is a product taken from the group consisting of apples, prunes, apricots, peaches, tomatoes, pears, grapes, strawberries, carrots, and oranges.

* * * * *